Oct. 15, 1968   J. G. VERTEGAAL   3,405,423
DEVICE FOR SEVERING THE ANKLE JOINT OF A LEG OF A BIRD
Filed Dec. 6, 1965   2 Sheets-Sheet 2
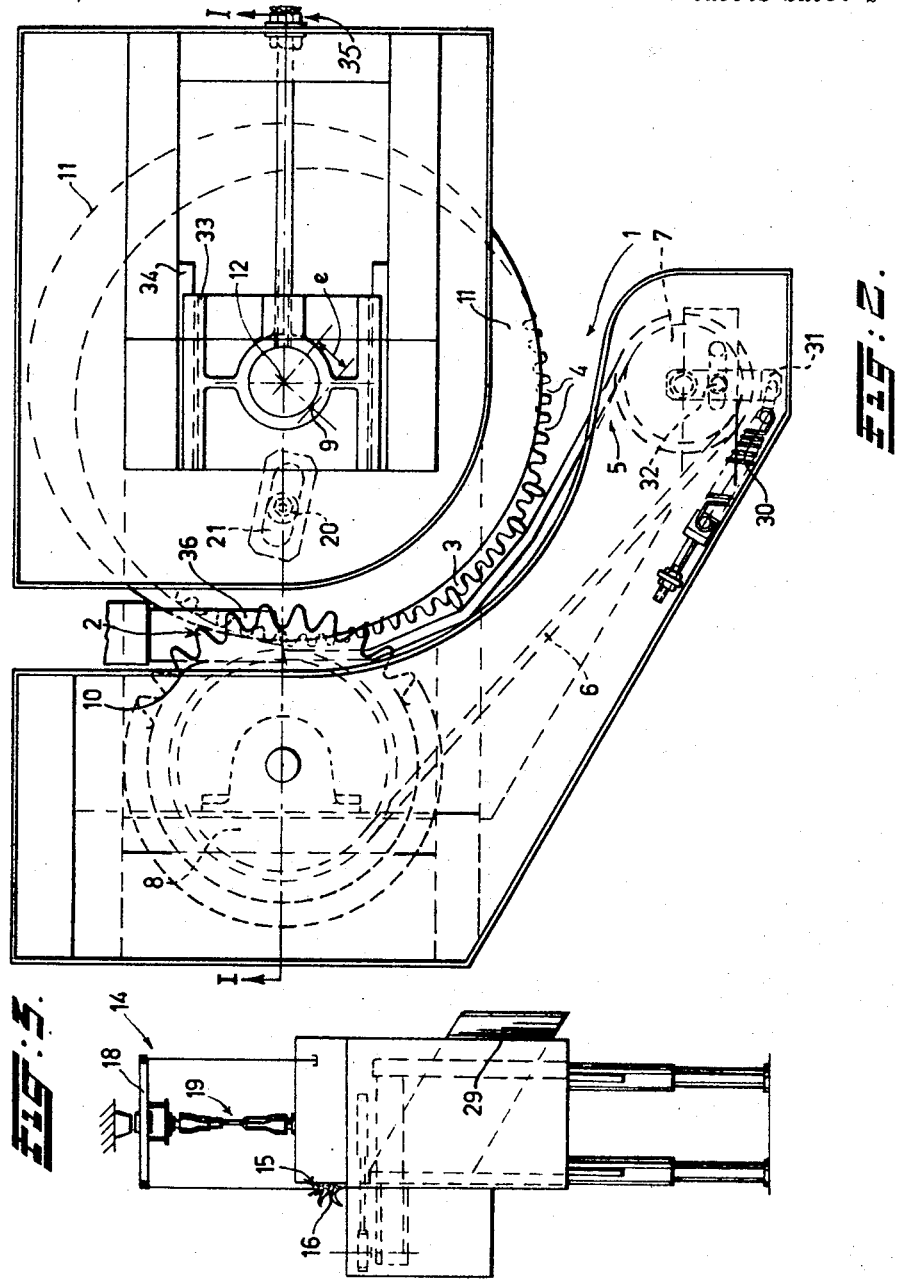
INVENTOR.
JACOBUS G. VERTEGAAL
BY
Edmund M. Jaskiewicz
ATTORNEY United States Patent Office 3,405,423
Patented Oct. 15, 1968

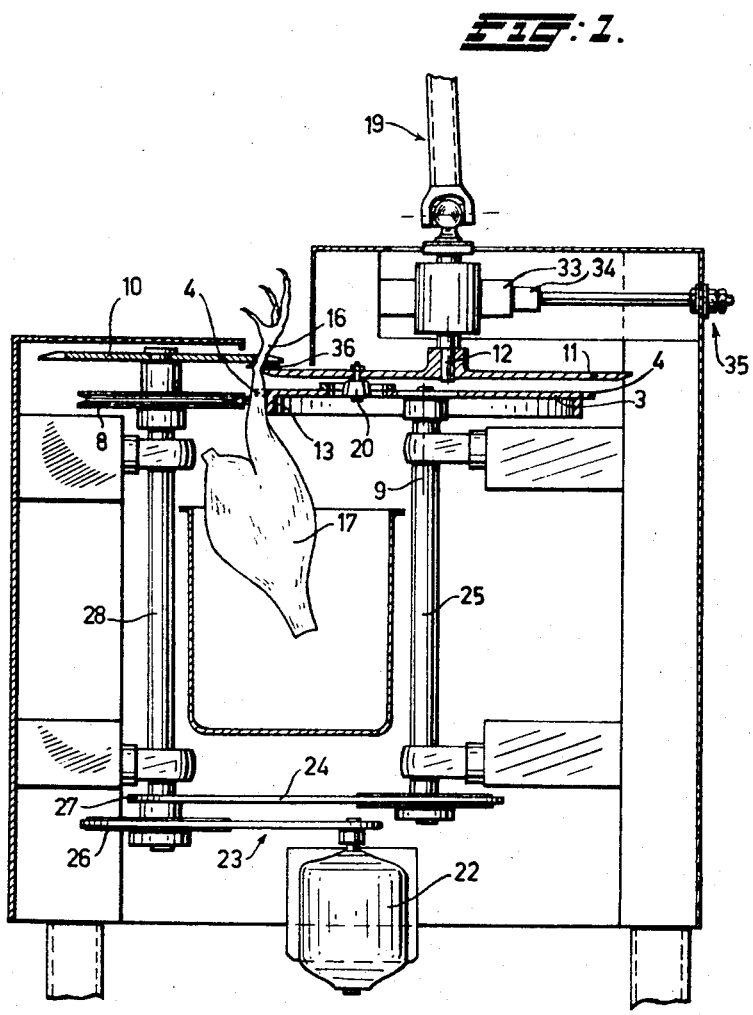

3,405,423
DEVICE FOR SEVERING THE ANKLE JOINT
OF A LEG OF A BIRD
Jacobus Gerardus Vertegaal, Boxmeer, Netherlands, assignor to Gebroeders Stork & Co's Apparatenfabriek N.V., Boorstraat, Amsterdam, Netherlands, a limited-liability company
Filed Dec. 6, 1965, Ser. No. 511,785
Claims priority, application Netherlands, Dec. 15, 1964, 6414616
3 Claims. (Cl. 17—11)

ABSTRACT OF THE DISCLOSURE

A poultry processing apparatus for cutting the ankle joint of a leg of a bird suspended by the foot thereof with the leg being advanced along a curved feeding path between a flexible endless belt and a recess in the periphery of a driven disc to the cutting member.

---

The invention relates to a device for cutting through the ankle joint of a leg of a bird suspended by this leg, especially the leg of an externally cleaned fowl, which device is provided with feeding means and a separating member, the latter consisting of two parts. Such a device and many variants thereof are known, wherein, however, in order to ensure the proper progress of the intended operation always supervision or intervention by hand is required.

It is an object of the invention to provide a device which automatically performs the following operations upon the leg to be severed: gripping, transporting, positioning, pulling open the ankle joint, and finally severing the leg. It is a further object of the invention to grip the leg of the fowl progressively and to direct it exactly on account of the co-operation between a first and a second member forming together the feeding means, so that severance of the ankle joint is effected in a desired way without the risk of disturbance.

It is a still further object of the invention to perform the introduction of the leg to be severed gradually and efficiently, whilst moreover exerting a sufficient gripping force on the leg of the fowl, which can only with difficulty or not at all be achieved in the prior art devices.

The invention further aims to realize an automatic discharge of the leg part gripped in the separating means will be produced subsequent to its severing.

The invention relates further to an installation for performing treatment on slaughter poultry, especially for externally cleaning fowls, the installation consisting of an overhead conveyor with shackles in which a leg of the fowl can be retained, the conveyor being provided with one or more turning wheels. An object of the invention is to synchronize the speed of the overhead conveyor and the severing device; this synchronization could not or only at great pains be realized in case of a conventional installation.

The foregoing and other objects and advantages of the invention will appear in the description to follow. In the description reference is made to the accompanying drawings, which form a part hereof, and in which there is shown by way of illustration and not of limitation a specific form in which the invention may be embodied.

In the drawings:

FIG. 1 shows on a reduced scale a vertical longitudinal section of a severing device, according to the line I—I in FIG. 2.

FIG. 2 is a plan view of the severing device.

FIG. 3 shows a side elevation to a still smaller scale of a severing device, in this figure the cooperation with the overhead conveyor is illustrated.

As will be appreciated from FIG. 2 the device consists of a feeder 1 and a separating member 2. The feeding means 1 consist of a driven first member 3, shaped as a circular ring or disc, in which laterally open recesses 4 are provided. This member 3 cooperates with a movable second member 5, situated beside the first mentioned member and constituted by an endless belt 6, which runs over turning wheels 7 and 8, the latter being situated in the vicinity of the circumference of the ring or disc 3.

The disc 3 is rotatable around a vertical centre line 9, so that the recesses 4 follow a substantially horizontal path. The belt 6 is partially situated beside this track which has an arc range with a value of about 90°. The arrangement is such that the belt 6 gradually approaches the recesses 4.

The separating member 2 consists of the parts 10 and 11. The part 10 is circular with dull teeth and an edge which is beveled at the upper side, said part being disposed so as to be concentrical to the turning wheel 8 at the end of the common track part. The other likewise circular part 11 of the separating member 2 is beveled at its lower side and is mounted for rotation around a vertical axis 12, which has a slight eccentricity e in respect of the axis of rotation 9 of the disc 3, this eccentricity being directed away from the central area of the common track part.

As is visible in FIG. 1 the disc 3 is on its lower end provided with a cylindrical flange 13, the outer diameter of which practically corresponds with the diameter of the base circle through the bottom of the recesses 4. The belt 6, that is to say the turning wheels 7 and 8 are at a level below the plane through the disc 3, so that the belt 6 is capable of cooperation with the flange 13.

It will be appreciated from FIG. 3 that the severing device can be combined with an overhead conveyor 14 with shackles 15 in which a leg 16 of the poultry 17 to be treated can be retained.

Due to the curved shape of the track part the belt 6 presses the leg 16 in order to force same firmly into a recess 4. The overhead conveyor 14 is provided with a turning wheel 18. The severing device is arranged below this wheel, a torsion free rotary coupling 19 being provided between the turning wheel 18 and the driven first member 3 of the feeding means 1 (see also FIG. 1). This coupling is not direct but proceeds via the part 11 of the separating member to which is secured a roller 20, the latter slidably engaging a slit 21 in the disc 3.

As a possible power booster for the severances aimed at, a source of power 22 is provided, said source being constructed as an electrical brake motor, which in the present case can produce an energy of 20 kg. cm./sec.² This motor 22 is coupled via two reduction stages 23 and 24 to a shaft 25 carrying the disc 3. The large gear wheel 26 of the stage 23 and the small gear wheel 27 of the stage 24 are interconnected and jointly secured to a shaft 28. The turning wheel 8 is mounted for free rotation at the upper end of this shaft, while the part 10 of the separating member 2 is fixedly secured to the shaft 28.

Represented in FIG. 3 is finally a discharge gully 29 for the cut off fowl. The severed part of the leg 16 which is still in the shackle 15 is discharged from this shackle in a conventional way, which is however, not illustrated in the drawing, so that the overhead conveyor can again pick up another fowl to be treated.

The tension of the belt 6 can be controlled by means of a draw spring 30 which by way of a lever 31 with a fixed pivot 32 presses the turning wheel towards the right (as contemplated in FIG. 2).

The cooperating edges of the separating member, that is to say the beveled teeth of the part 10 and the beveled circumference of the part 11, engage as a wedge in the leg joint of the bird which is thus forced open. A thin knife 36 (see FIG. 2) situated between the overlapping parts 10 and 11, is now easily capable of severing the stretched ligaments so that the metatarsis is separated from the tibia. The part 11 can be adjusted in respect of the part 10 by means of a shoe 33 which is movable in a guide 34 through the agency of an adjusting nut 35.

The most important advantages of the severing device according to the invention consist in that due to the common curved track part between the circumference of the disc 3 and the belt 6 it is ensured that the leg to be severed is gripped and positioned in the correct way, while simultaneously a correct synchronization with the forward speed of the conveyor (e.g. overhead conveyor) of the installation for processing slaughter poultry is obtained, for which the severing device according to the invention is especially destined. The same advantages can be obtained on coupling other devices for working poultry, like for instance a device for cutting through the neck.

Since the leg of the poultry to be treated gradually engages a recess 4 of the disc 3 the ankle joint to be severed can be simultaneously positioned and separated. Due to the eccentric placement of the parts 3 and 11 in respect of one to the other an automatical discharge of the treated fowls can be obtained.

While a preferred embodiment of the invention has been shown and described, it is to be understood that changes and variations may be made without departing from the spirit and scope of the invention as defined in the appended claims.

What I claim is:

1. In a poultry processing apparatus for cutting the ankle joint of a leg of a bird suspended by the foot thereof as the bird is advanced along the predetermined path, the combination of a driven disc rotatable around a vertical axis and having laterally open recesses on the periphery thereof, a pair of pulleys adjacent said disc and positioned to subtend an angle of substantially 90 degrees therewith, a flexible endless belt on said pulleys with a reach thereof underlaying a portion of said disc adapted to conform substantially to the periphery of said disc when a leg is gripped between a disc recess and said belt whereby the leg is fed along a curved path, and a cutting member mounted in the vicinity of the end of the curved path defined by the overlapping disc and belt for cutting the ankle joint.

2. In a poultry processing apparatus as claimed in claim 1 with there being a cylindrical flange on the lower face of said disc with the outer diameter of said flange corresponding substantially with a circle defined by the bofittoms of said laterally open recesses, said belt being below the plane of said disc and cooperating with said flange.

3. In a poultry processing apparatus, the combination of an overhead conveyor line having shackles for retaining the foot of a poultry carcass whereby the carcass is suspended therefrom, said conveyor having at least one wheel for supporting the same, a machine for processing poultry positioned below said conveyor wheel and including means for feeding the poultry to said processing machine, and a torsion free rotary coupling connecting said conveyor wheel with said feeding means, said processing machine comprising a driven disc rotatable around a vertical axis and having laterally open recesses on the periphery thereof, a pair of pulleys adjacent to said disc and positioned to subtend an angle of substantially 90 degrees therewith, a flexible endless belt on said pulleys with a reach thereof underlying a portion of said disc and adapted to conform substantially to the periphery yof said disc when a leg is gripped between a disc recess and said belt whereby the leg is fed along a curved path, said torsion free coupling being between said conveyor wheel and said driven dic.

References Cited

UNITED STATES PATENTS

| 2,846,718 | 8/1958 | Sengelaub et al. | 17—11 |
| 2,993,228 | 7/1961 | Zebarth | 17—12 |
| 3,199,143 | 8/1965 | Ousley et al. | 17—11 |
| 3,213,488 | 10/1965 | Volpe | 17—11 |
| 3,323,164 | 6/1967 | Bonuchi et al. | 17—11 |

LUCIE H. LAUDENSLAGER, *Primary Examiner.*